Patented Mar. 12, 1940

2,193,433

UNITED STATES PATENT OFFICE 2,193,433

N-POLY-HYDROXY-ALKYL-ARYLAMINES

Paul L. Salzberg, Wilmington, Del., assignor to E. I. du Pont de Nemours & Company, Wilmington, Del., a corporation of Delaware No Drawing. Application January 2, 1937, Serial No. 118,926

25 Claims. (Cl. 260—211)

This invention relates to N-hydroxy-alkyl-aryl-amines and to their preparation. The invention will be disclosed with particular reference to such compounds of the benzene and naphthalene series.

A variety of different compounds appear to be formed when a monose reacts with an aromatic amine. For example, some of the products have been identified as "Schiff's bases;" some have been shown to have the butylene oxide structure and to exist in alpha and beta forms; some have been identified as the alpha and beta compounds of the glucoside species; yet others have been proved to be the syn and anti forms of the Schiff's bases; and colored products have been produced of high molecular weight and unidentified structure.

It is an object of this invention to prepare N - poly - hydroxy - alkyl - arylamines containing three or more hydroxyl groups in the side chain. More particularly it is an object of the invention to prepare N-poly-hydroxy-alkyl-amines of the benzene and naththalene series by methods which are technically and economically satisfactory. Other objects of the invention will be in part apparent and in part elsewhere set forth.

It is my surprising discovery that the reduction of the products formed when a monose reacts with an aromatic amine produces compounds of similar properties, which are shown by the best methods of identification now available to have a similar structure. These compounds are represented by the formula:

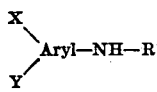

in which X and Y are each one of a group consisting of hydrogen, alkyl, alkoxy, hydroxy, amino, nitrile, nitro, aryl, and aralkyl, and R is the radical of a reducing sugar.

The objects of the invention are, consequently, accomplished by producing compounds of the nature described by a process which involves the reduction in the presence of a reducing catalyst, of the products formed by the reaction of a monose and an aromatic amine. In a preferred form of the invention an amino compound of the benzene or naphthalene series is reacted with its equivalent of a monose and the product is reduced with hydrogen in the presence of a nickel catalyst at a temperature between 80° and 130° C. and at 800 to 2400 pounds per square inch pressure.

The following examples illustrate but do not limit the invention.

EXAMPLE I

One hundred and eight grams (0.6 mol) of glucose, 55.8 grams (0.6 mol.) of redistilled aniline, 120 cc. of methyl alcohol and 25 cc. of water were refluxed until after four or five hours the glucose dissolved. Fifteen grams of nickel-on-kieselguhr catalyst were added and the reaction mixture was subjected to heating in a shaker tube at 120–130° C. under a hydrogen pressure between 1000 and 2000 pounds for two to two and one-half hours. The catalyst was removed by filtration, the alcohol was removed by vacuum evaporation, and a crude product remained as a light yellow, brittle, glass-like solid, which is believed to be phenyl glucamine (N-sorbityl-aniline) and is represented by the formula:

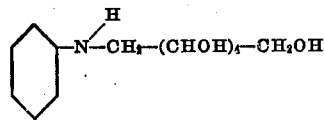

EXAMPLE II

Fifty grams (0.35 mol.) of alpha-naphthylamine, 63 grams (0.35 mol.) of glucose, and 120 grams of absolute ethyl alcohol were heated to refluxing until all the glucose had dissolved, about fifteen hours being required. Ten grams of Raney nickel catalyst were added, the reaction mixture was subjected to hydrogenation for two hours in a shaker tube at 90° C. at between 1200 and 2000 pounds hydrogen pressure, the catalyst was removed by filtration, and vacuum evaporation of the alcohol left a crude brown solid product which is believed to be N-sorbityl-alpha-naphthylamine and is represented by the formula:

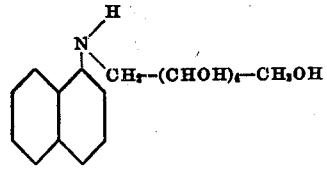

EXAMPLE III

Forty-eight grams (0.35 mol.) of cresidine, 63 grams (0.35 mol.) of glucose, and 120 grams of absolute alcohol were heated to reflux until all of the glucose had dissolved. Ten grams of Raney nickel catalyst were added and the reaction mixture was subjected to hydrogenation in a shaker tube at 90° C. under 2000 to 2400 pounds hydrogen pressure for one hour. The product was less soluble in alcohol than the starting material and about two liters of hot ethyl alcohol were used to dissolve it before removing the catalyst by filtration. Upon cooling the solution the reduction product was obtained as a white crystalline solid melting at 161° C. It is believed to be N-sorbityl-cresidine and is represented by the formula:

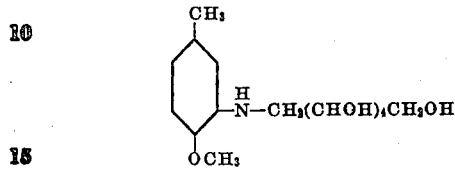

EXAMPLE IV

One thousand six hundred and five grams of m-toluidine, 3000 grams of glucose, and 6000 cc. of methyl alcohol were heated until all of the glucose had dissolved, about twenty hours in all. Five hundred grams of nickel catalyst were added, and hydrogenation was effected in an autoclave at 90° C. under a hydrogen pressure of 1000 pounds for nine hours. The catalyst was removed from the hot solution by filtration, and the product crystallized out on cooling to about 15° C. Recrystallization from methyl alcohol yielded 2105 grams of N-sorbityl-m-toluidine a somewhat sticky solid, which is represented by the formula:

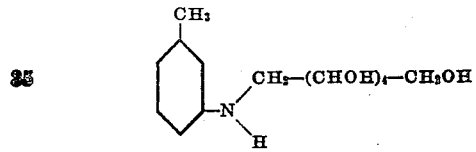

EXAMPLE V

One hundred and twenty-one grams of p-xylidine, one hundred and ninety-eight grams of glucose, and 600 cc. of methyl alcohol were refluxed for about 16 hours, and the solution was placed in an autoclave, and was hydrogenated at 85° C. and 800 pounds pressure in the presence of a nickel catalyst. When no more hydrogen was assimilated, the solution was filtered hot, was cooled, and a product separated in crystals which is believed to be 2:5-dimethyl-N-sorbityl-aniline and is represented by the formula:

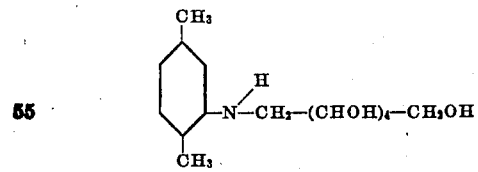

EXAMPLE VI

One hundred and nine grams of p-hydroxy aniline were dissolved in 1500 cc. of methyl alcohol, 198 grams of glucose were added, and the solution was refluxed for four hours, placed in an autoclave containing 70 grams of nickel catalyst, and hydrogenated at 90° C. under a pressure of 800 pounds until no more hydrogen was assimilated. The hydrogenation product was filtered hot, cooled to 10° C., and after seven hours the product began to separate as a solid mass. The alcohol was filtered off and the 4-hydroxy-phenyl-glucamine was dried in vacuo. It melted at 154–156° C. Analysis:

Percent nitrogen found_____ 4.84
Percent nitrogen theory_____ 5.13

It is believed to be 4-hydroxy-phenyl-glucamine and is represented by the formula:

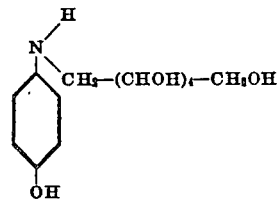

Meta-amino-phenol was substituted for p-amino-phenol in the above process with success.

EXAMPLE VII

One mole of p-acetamino-aniline and one mole of glucose were refluxed in methanol for 2½ hours, the solution was hydrogenated at 85° C. and 800 pounds hydrogen pressure for two hours in the presence of a catalyst, was filtered hot, cooled, and the product, which crystallized out, was removed by filtration and dried in vacuo. Melting point 141.5 to 142.6° C. Analysis:

Percent nitrogen found_____ 8.3
Percent nitrogen theory_____ 8.64

It is believed to be p-acetyl-amino-phenyl-glucamine and is represented by the formula:

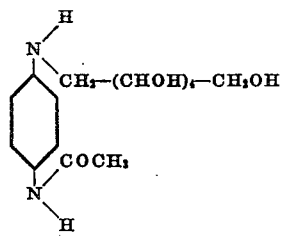

Fifty grams of the acetyl derivative were dissolved in 300 grams of methyl alcohol containing 11.6 grams of HCl and refluxed for three hours. A solid hydrochloride of p-amino-phenyl-glucamine precipitated. It melted at 183–185° C., decomposing at 190° C.

EXAMPLE VIII

One mol of ortho anisidine and one mol of glucose were refluxed with 1500 cc. of methyl alcohol for 1½ hours, the alcoholic solution was hydrogenated at 85° C. and 800 pounds hydrogen pressure in the presence of a nickel catalyst for two hours, and filtered hot. A solid product crystallized out on cooling. Analysis:

Percent nitrogen found_____ 4.72
Percent nitrogen theory_____ 4.88

It is believed to be 2-methoxy-N-phenyl-glucamine and is represented by the formula:

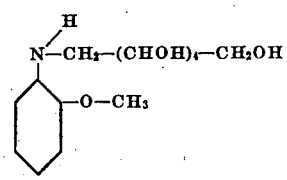

2:5-dimethoxy-aniline and m-anisidine were substituted for o-anisidine in this example with success.

Example IX

Sixty-nine grams of m-nitro-aniline, 100 grams of glucose and 500 cc. of methyl alcohol were refluxed for 30 hours, 30 grams of the product were isolated, dissolved in 400 cc. of methyl alcohol, placed in an autoclave with 7 grams of nickel catalyst, and hydrogenated at 85° C., and 1000 pounds hydrogen pressure for three hours. The hot solution was filtered and evaporated to dryness. The dry solid obtained was extracted with ether, leaving 23 grams of a compound reduced in both substituents and believed to be N-sorbityl-m-amino-aniline and represented by the formula:

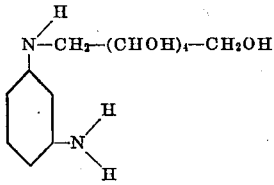

Example X

*Phenyl-fructamine or N-phenyl-2-amino-sorbitol*

90 grams (0.5 mol) fructose, 46.5 grams (0.5 mol) of redistilled aniline, and 120 cc. of ethyl alcohol were heated to refluxing until the fructose was entirely dissolved and a homogeneous solution was obtained, 13 grams of Raney catalyst were added and the reaction mixture subjected to hydrogenation in a shaker tube at 90–100° C. under 1200–2000 pounds hydrogen pressure until absorption of hydrogen ceased. After removal of the catalyst by filtration, vacuum evaporation of the alcohol yielded crude phenyl-fructamine as a light yellow, brittle solid. It is represented by the formula:

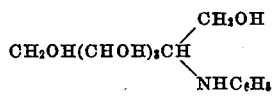

In the preceding examples the aldo-hexoses, the tetroses, the pentoses and any ketonic sugar can be substituted for glucose. Specific examples of these substituents are erythrose, arabinose, fructose, xylose, and laevulose. Other reducing sugars, examples of which are lactose and maltose, may be used. The process itself can be varied by hydrogenating solutions of monoses in the presence of primary aromatic amines, i. e., the amine, the monose, the solvent and the catalyst may be placed in the autoclave together and the reduction performed under the conditions listed in the previous examples. The reactions resulting in the products can be carried out with a wide variety of combinations of temperature and pressure. Pressures over a range of 15 to 20 atmospheres to about 2400 pounds per square inch are useful and a desirable temperature range is about 80° C. to about 140° C. Besides the combinations of temperature and pressure heretofore indicated, pressures of about 15 to about 20 atmospheres and 90° C. to about 140° C. can be used.

In the preferred form of the invention primary amines of the benzene and naphthalene series free of substituents or containing one or more of the substituents halogen, nitro, nitrile, alkyl, aryl, aralkyl, hydroxy, and mercapto can be employed. The presence of the substituent solubilizing groups COOH and SO₃H may be tolerated. The compound must contain a primary amino group directly attached to the ring.

Other base metal catalysts, e. g., cobalt, may be substituted for nickel, but their results are not always equivalent to nickel, and in the preferred form of the invention nickel will be used.

An advantage of the invention is in the production of new compositions of matter of valuable properties for industrial purposes. Other advantages of the invention are the production of these new compounds by processes which are technically and economically satisfactory. Other advantages of the invention will be apparent from a consideration of the specification.

As many apparently widely different embodiments of the invention may be made without departing from the spirit and scope thereof, it is to be understood that I do not limit myself to the specific embodiments thereof except as defined in the appended claims.

I claim:

1. An- N-aryl-glucamine which is devoid of nitro groups.

2. The N-arylglucamines which are devoid of nitro groups, wherein the aryl is of the benzene series, being stable crystallised compounds considerably more difficultly soluble in water than the corresponding sugars, soluble however, as a rule in mineral acids and precipitated therefrom in unchanged condition.

3. The glucamino-benzene which is devoid of nitro groups, the new compound forming colourless crystals melting at 128° C., being scarcely soluble in water and alcohol, insoluble in ether and benzene, easily soluble in dilute mineral acids and precipitated from the acid solution in unchanged condition.

4. A compound represented by the formula

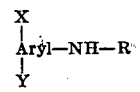

in which Aryl is a nucleus of the group consisting of benzene and naphthalene, X and Y are each one of a group consisting of hydrogen, alkyl, alkoxy, hydroxy, amino in the meta- or para-position to -NHR, nitrile, aryl and aralkyl and R is the radical of an aldose having at least 4 and not more than 6 carbons.

5. The N-aryl aldosamines in which aryl is of the benzene and naphthalene series and is devoid of nitro groups and the aldose radical is the residue of a six carbon aldose.

6. A compound represented by the formula

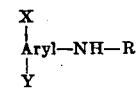

in which Aryl is a nucleus of the group consisting of benzene and naphthalene, X and Y are each one of a group consisting of hydrogen, alkyl, alkoxy, hydroxy, amino in the meta- or para-position to -NHR, nitrile, aryl and aralkyl and R is the radical of an aldose having 5 carbons.

7. The compound represented by the formula:

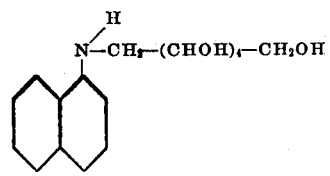

8. A compound represented by the formula:

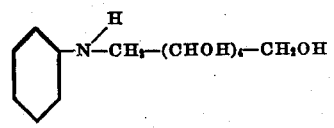

9. A compound represented by the formula:

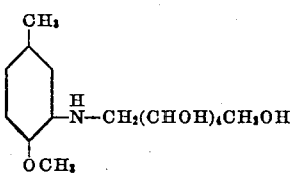

10. The process for the manufacture of N-aryl-glucamines, which comprises hydrogenating solutions of monoses in the presence of primary amines of the benzene series and a nickel catalyst at an elevated temperature of 90-140° C. and about 15 to about 20 atmospheres pressure.

11. The process for the manufacture of N-aryl-glucamines, wherein the aryl is of the benzene series, which consists in hydrogenating a solution of an aldose and an amine of the benzene series in the presence of a metallic hydrogenation catalyst at a pressure of at least 15 atmospheres and a temperature of 90-140° C.

12. The process which comprises heating a mixture containing a product resulting from reacting an aldose having 5 carbons and a primary arylamine of the benzene and naphthalene series, a metal catalyst having an atomic weight of about 58, and an inert solvent; and hydrogenating the mixture at a temperature of about 80° C. to about 140° C. and about 800 to about 2400 pounds pressure until an N-aryl-aldosamine is formed.

13. The process which comprises heating a mixture containing an aldose, a primary arylamine of the benzene series, and methyl alcohol, and hydrogenating the resultant solution in the presence of a nickel catalyst at a pressure of at least 15 atmospheres and at a temperature of 90-140° C.

14. The process which comprises reacting glucose with a compound represented by the formula

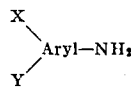

in which X and Y are each one of a group consisting of hydrogen, alkyl, alkoxy, hydroxy, amino, nitrile, nitro, aryl, and aralkyl, and reducing the product in an atmosphere of hydrogen, and in the presence of a nickel catalyst.

15. The process which comprises reacting glucose with a compound represented by the formula

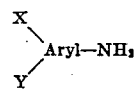

in which X and Y are each one of a group consisting of hydrogen, alkyl, alkoxy, hydroxy, amino, nitrile, nitro, aryl, and aralkyl, and reducing the product in an atmosphere of hydrogen and in the presence of a base metal catalyst having an atomic weight of about 58.

16. The process which comprises reacting glucose with a compound represented by the formula

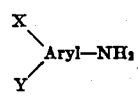

in which X and Y are each one of a group consisting of hydrogen, alkyl, alkoxy, hydroxy, amino, nitrile, nitro, aryl, and aralkyl, and reducing the product in the presence of a base metal catalyst having an atomic weight of about 58.

17. The process which comprises reacting glucose with a compound represented by the formula

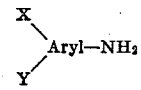

in which X and Y are each one of a group consisting of hydrogen, alkyl, alkoxy, hydroxy, amino, nitrile, nitro, aryl, and aralkyl and reducing the product.

18. The process which comprises reacting glucose and alpha naphthylamine in solution and hydrogenating the product in the presence of a nickel catalyst.

19. The process which comprises heating a mixture containing a glucose, a primary arylamine of the benzene series, and methyl alcohol, and hydrogenating the resultant solution in the presence of a nickel catalyst at a pressure of at least 15 atmospheres and at a temperature of 90-140° C.

20. The process which comprises heating a mixture containing a glucose, aniline and methyl alcohol, and hydrogenating the resultant solution in the presence of a nickel catalyst at a pressure of at least 15 atmospheres and at a temperature of 90-140° C.

21. The process for the manufacture of N-phenyl glucamine which consists in heating a mixture containing glucose, aniline and methyl alcohol under reflux conditions until a solution is obtained, and hydrogenating the resultant solution in the presence of a nickel catalyst at a pressure of at least 15 atmospheres and a temperature of 90-140° C.

22. The process for the manufacture of N-aryl-glucamines, wherein the aryl is of the benzene series, which consists in hydrogenating a solution containing a reaction product of an aldohexose and a primary amine of the benzene series in the presence of a nickel catalyst at a pressure of at least 15 atmospheres and a temperature of 90-140° C.

23. Process for the manufacture of glucamino benzene which consists in hydrogenating a solution containing a reaction product of glucose and aniline in the presence of a metallic hydrogenation catalyst at a pressure of at least 15 atmospheres and a temperature of 90-140° C.

24. Process for the manufacture of glucamino benzene which consists in hydrogenating a solution containing glucose and aniline in the presence of a nickel catalyst at a pressure of at least 15 atmospheres and a temperature of 90-140° C.

25. The process which comprises dissolving about 63 grams of glucose, about 50 grams of alpha-naphthylamine in about 120 grams of ethyl alcohol at refluxing temperature, admixing therewith 10 grams of nickel catalyst, and hydrogenating at 90° C. and between 1200 and 2000 pounds pressure, filtering and evaporating from the product the volatile constituents.

PAUL L. SALZBERG.